US008060298B2

(12) United States Patent  (10) Patent No.: US 8,060,298 B2
Cheung et al.  (45) Date of Patent: Nov. 15, 2011

(54) MULTIPLE DIRECTIONS TO A DESTINATION WITHOUT PROVIDING A SPECIFIC ORIGIN

(75) Inventors: Matthew Cheung, Redmond, WA (US); Jeffrey D Couckuyt, Bothell, WA (US); Markus Jansen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 487 days.

(21) Appl. No.: 11/870,919

(22) Filed: Oct. 11, 2007

(65) Prior Publication Data

US 2009/0099770 A1  Apr. 16, 2009

(51) Int. Cl.
*G01C 21/00* (2006.01)
*G01C 21/30* (2006.01)
*G08G 1/123* (2006.01)
(52) U.S. Cl. .... 701/201; 701/202; 701/209; 340/995.19
(58) Field of Classification Search .......... 701/200–226; 340/988–996
See application file for complete search history.

(56) References Cited

U.S. PATENT DOCUMENTS

| 5,774,073 | A | * | 6/1998 | Maekawa et al. | ........ | 340/995.21 |
|---|---|---|---|---|---|---|
| 6,278,938 | B1 | | 8/2001 | Alumbaugh | | |
| 6,321,158 | B1 | | 11/2001 | DeLorme et al. | | |
| 6,477,526 | B2 | * | 11/2002 | Hayashi et al. | ........................ | 1/1 |
| 6,826,472 | B1 | * | 11/2004 | Kamei et al. | .................. | 701/202 |
| 7,092,819 | B2 | | 8/2006 | Odachi et al. | | |
| 2003/0139150 | A1 | * | 7/2003 | Rodriguez et al. | .............. | 455/90 |
| 2006/0199612 | A1 | * | 9/2006 | Beyer et al. | ................. | 455/556.2 |
| 2006/0265119 | A1 | | 11/2006 | McMahan et al. | | |
| 2007/0156326 | A1 | | 7/2007 | Nesbitt | | |

FOREIGN PATENT DOCUMENTS

| JP | 1998-082651 A | 3/1998 |
|---|---|---|
| KR | 10-2002-0064495 A | 8/2002 |
| KR | 10-2007-0087419 A | 8/2007 |
| WO | 98/12688 A1 | 3/1998 |

OTHER PUBLICATIONS

Google Map, map view, Feb. 2007.*
Grand-central station, ny-google maps.htm.*
34th street Penn station, Google maps.htm.*
"Advantage API Product White Paper", Nov. 4, 2005, MapQuest.com., Inc., 2005, pp. 22.
"Explore Google Maps", pp. 1-3.
"Live Search Maps launches photo-realistic 3-D imagery of New York City, several other cities.", Microsoft Corporation, 2007, p. 1.
International Search Report and Written Opinion for PCT Application No. PCT/US2008/077316, mailed on Feb. 23, 2009, 11 pages.

* cited by examiner

*Primary Examiner* — James Trammell
*Assistant Examiner* — Muhammad Shafi

(57) ABSTRACT

The automatic generation of multiple sets of directions for navigating geographically to a specific destination without specification of an origin. Based on the destination, candidate roads or other transportation conduits are selected for analysis. Candidate meta-departure points are analyzed and selected along the roads based on distribution about the destination, cardinal directions relative to the destination, road metadata, distance to the destination, driving time, and other factors. The number of departure points generated to represent routes to the destination from the several logical cardinal directions is minimized. The generated departure points also represent routes that a majority of people would likely take to the destination. Additionally, the generated departure points originate from places that users are likely to be familiar with and can get to without additional guidance. The final instruction sets for navigating to the destination are presented along with a map that identified the departure points.

20 Claims, 11 Drawing Sheets

MULTIPLE DIRECTIONS TO A DESTINATION WITHOUT PROVIDING A SPECIFIC ORIGIN

BACKGROUND

The Internet has made available myriad of services and information. When customers search and find the desired information, it is becoming commonplace for the associated vendor website to provide an address to a local store and a link to a mapping service will show locations of businesses that sell the products or services locally. Additionally, the user can select to obtain directions from the user location to one of the local business locations using the mapping service.

Existing solutions such as these are functional but require more time and effort on the part of the user because of the conventional need of the mapping service have the starting location (or origin address). In many situations, the user is somewhat familiar with at least a part of the route; thus, detailed instructions for directions for the entire route to the destination are not necessary.

Another shortcoming of conventional mapping systems involves the situation where the origin (or starting point) is unknown or cannot be precisely determined. An example of this is an invitation to a business party in a city that the user is visiting. In many cases, the user may not readily know the originating address (e.g., if stopping in a cyber café). Thus, existing solutions require the manual crafting of a multi-approach map, which is resource consuming and cannot be readily scaled.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The techniques described herein facilitate the automatic generation of multiple sets of instructions that guide a user geographically to a specific destination without specifying an origin. The user obtains useful directions to the desired destination without having to enter information about the origin, which not be readily known, thereby saving time and effort. In other words, the user may be more familiar with landmarks, structures, roads, highways, etc., in a given region, which can be used to provide navigational directions to the desired destination location.

A part of providing the multiple sets of instruction to a destination without knowledge of a specific starting location is the generation of suitable meta-departure points. In one embodiment, the meta-departure points are selected relative to major roadways or transportation conduits nears that extend to or near the destination. The roadways or conduits can be selected based on common-knowledge in the region or area, road metadata (e.g., type, speed allowed), alignment with cardinal directions, and other factors and criteria.

The number of departure points generated to represent routes to the destination from the several logical directions is minimized. The generated departure points also represent routes that a majority of people would likely take to the destination. Additionally, the generated departure points originate from places that users are likely to be familiar with and can get to without additional guidance.

A list of final meta-departure points is selected from a set of candidate meta-departure points. The instruction sets for each of the final meta-departure points are generated and can be presented along with a map that graphically depicts the final meta-departure points, destination, and routes therebetween.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and equivalents. Other advantages and novel features will become apparent from the following detailed description when considered in conjunction with the drawings.

DETAILED DESCRIPTION

Figure 1:
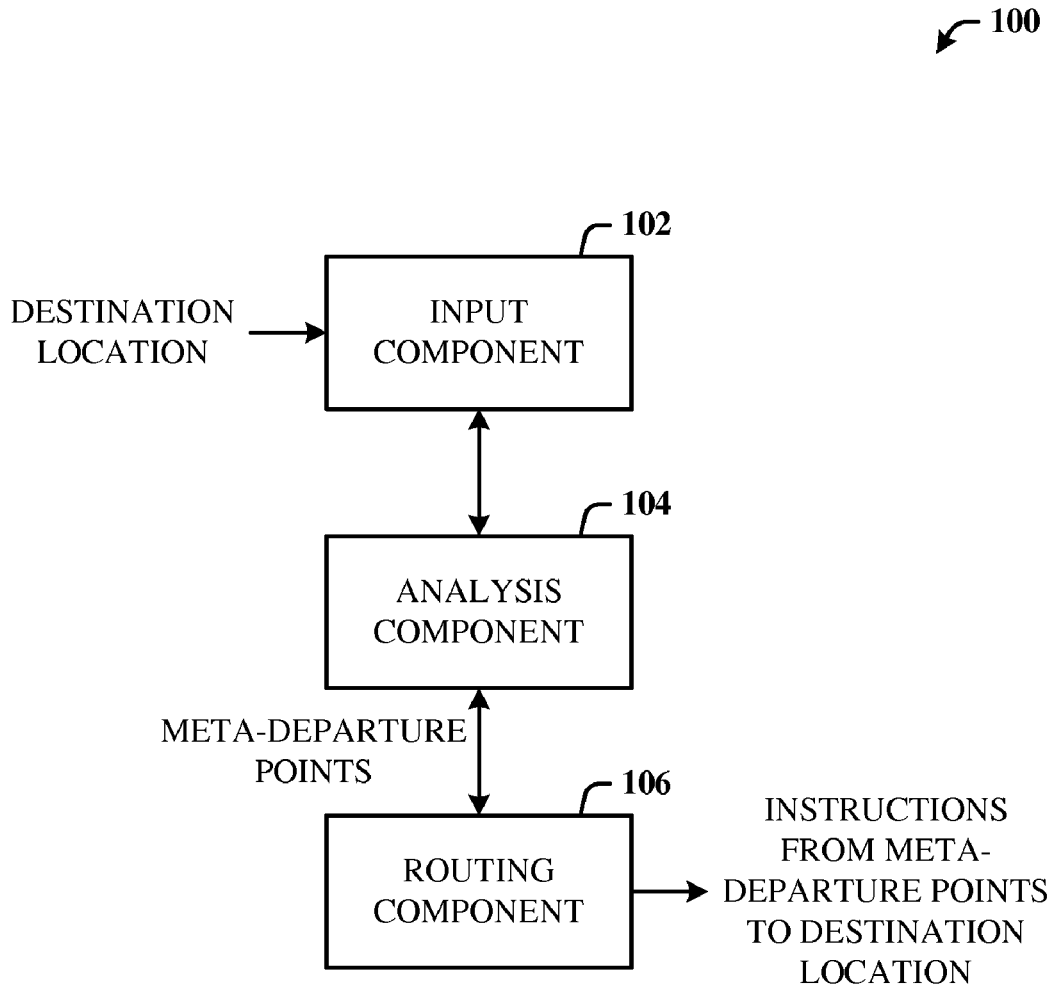
FIG. 1 illustrates a computer-implemented navigation system that provides multiple sets of directions to a destination without specification of an origin.

The disclosed architecture functions by generating multiple suitable meta-departure points (MDPs), computing directions from those MDPs to a specified destination location, and presenting an innovative user interface that allows ease-of-use, yet providing full flexibility of traditional direction or mapping systems. This is independent of the user providing a starting location.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

FIG. 1 illustrates a computer-implemented navigation system 100 that provides multiple sets of directions to a destination without specification of an origin. The system 100 includes an input component 102 for receiving a destination location to which a user wants to travel. An analysis component 104 selects meta-departure points based on the destination location, independent of receiving a starting location (or origin). A routing component 106 automatically generates instructions for geographically navigating from the multiple meta-departure points to the destination location.

The meta-departure points are the points automatically generated by the system 100 based on analysis of the region (e.g., neighborhood, city, multi-city area, state, multi-state area, etc.), transportation system, and which have a high likelihood of being are commonly known by a significant portion of the populace in that region. The granularity is limited only by the mapping system employed. For example, the user may want directions for traveling from home to a destination location that is a house on the next street, to the nearest small city, to the nearest big city in the state, and so on.

The following general goals are employed when analyzing the given destination location for the generation of meta-departure points. The meta-departure points: originate from locations which are likely to be familiar to most local users, such that the users can get to these familiar locations without further guidance; are located along major transportation approaches that are logical for that particular destination thereby spawning direction sets that make sense for users coming from different approaches; are located within a certain cost function, the cost function based on distance, route complexity, current traffic conditions, weather conditions, construction conditions, etc.; are distributed geographically and cardinally around the destination location such that a minimum of meta-departure points can cover the largest percentage of potential inbound travel routes; and, include sufficient information to fully describe the departure point in a user interface.

The specifics of the MDPs can vary according to the transportation mode requested, culture, and locality. Possible approaches for generating these meta-departure points include from the destination location outward (or "inside out") and from commonly-known landmarks (or "interesting" points) within a certain distance from the destination location (or "outside in"). In general, the technique involves the selection of a set of candidate interesting points (meta-departure points), a narrowing-down of the candidate points to the top N candidate points (where N is a configurable number), and the packaging/presentation of the results (directions) with an informative label and instruction to navigating to the destination.

Accordingly, the analysis component 104 can analyze the region relative to the destination information, automatically generate candidate points, and select the final meta-departure points based on local locations that are likely to be familiar to local users, based on proximity of the MDPs to major transportation routes and to the destination location, based on a cost function that considers distance and route complexity from the meta-departure points to the destination location, and based on geographical distribution of the meta-departure points relative to the destination location. It is desirable that an MDP is likely to be known by the potential user. Thus, in addition to the above criteria, the system 100 can also consider the proximity of potential points to major landmarks that a user is likely to know.

Additionally, the analysis component 104 can select a minimum number of the meta-departure points that cover a greatest percentage of inbound routes to the destination location, generates candidate meta-departure points by searching outward from the destination location relative to major transportation routes until a predetermined number of the candidate meta-departure points is obtained, and generates candidate meta-departure points from which the meta-departure points are chosen by selecting locations within a predetermined distance from the destination location and searching inward from the locations for the candidate meta-departure points relative to commonly-known transportation routes to the destination location. The selected candidate meta-departure points selected based on a distribution about or relative to the destination location and according to cardinal directions.

Figure 2:
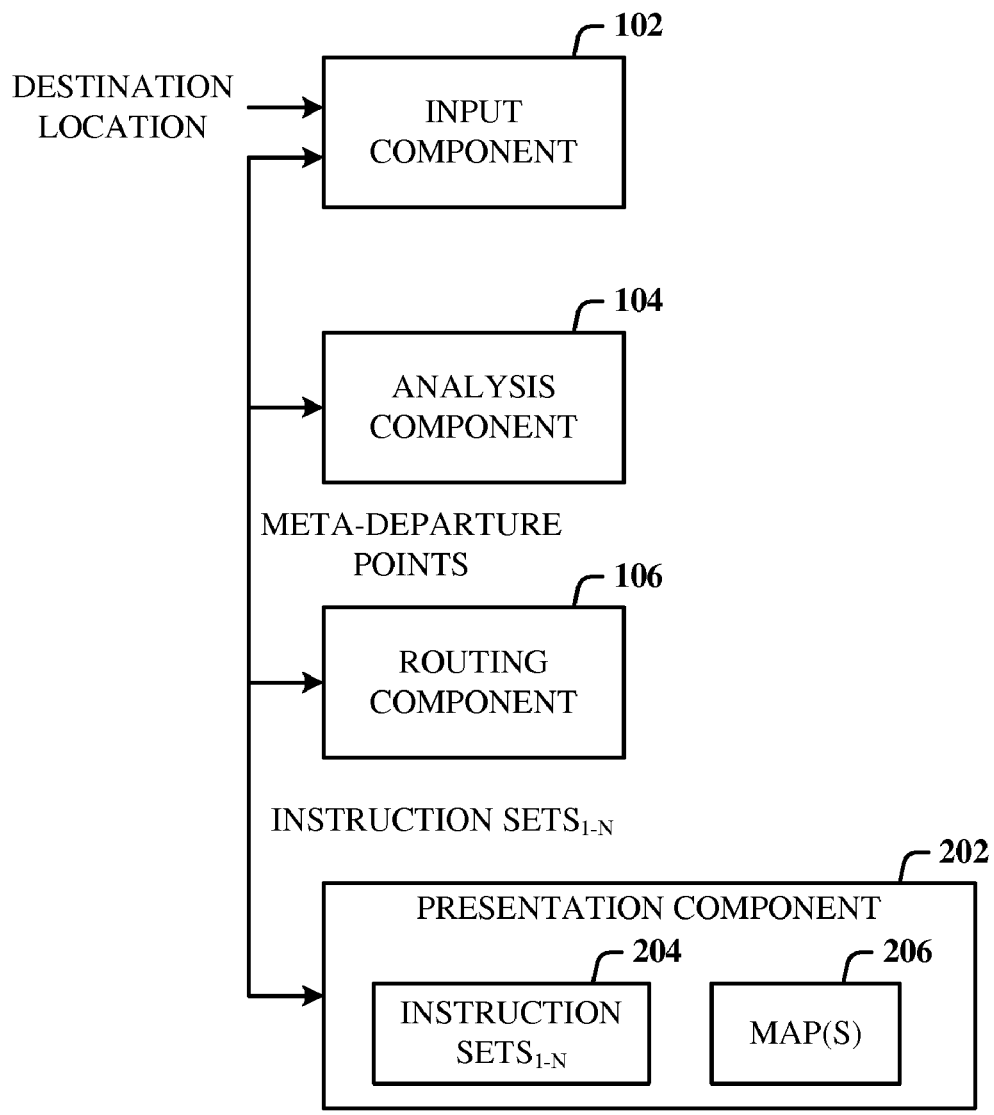
FIG. 2 illustrates a system that further comprises a presentation component for presenting instructions for navigating to the destination.

FIG. 2 illustrates a system 200 that further comprises a presentation component 202 for presenting instructions for navigating to the destination. The system 200 includes the input component 102, analysis component 104 and routing component 106 of FIG. 1 operating in combination with the presentation component 202. The presentation component 202 receives instruction sets 204 (INSTRUCTION SETS$_{1-N}$) from the routing component 106 as separate lists of instructions for guiding the user from the corresponding meta-departure points to the destination location. The presentation component 202 can also obtain and present a map 206 that illustrates the meta-departure points relative to transportation routes and the destination location. An example of this is described in FIG. 5.

Figure 3:
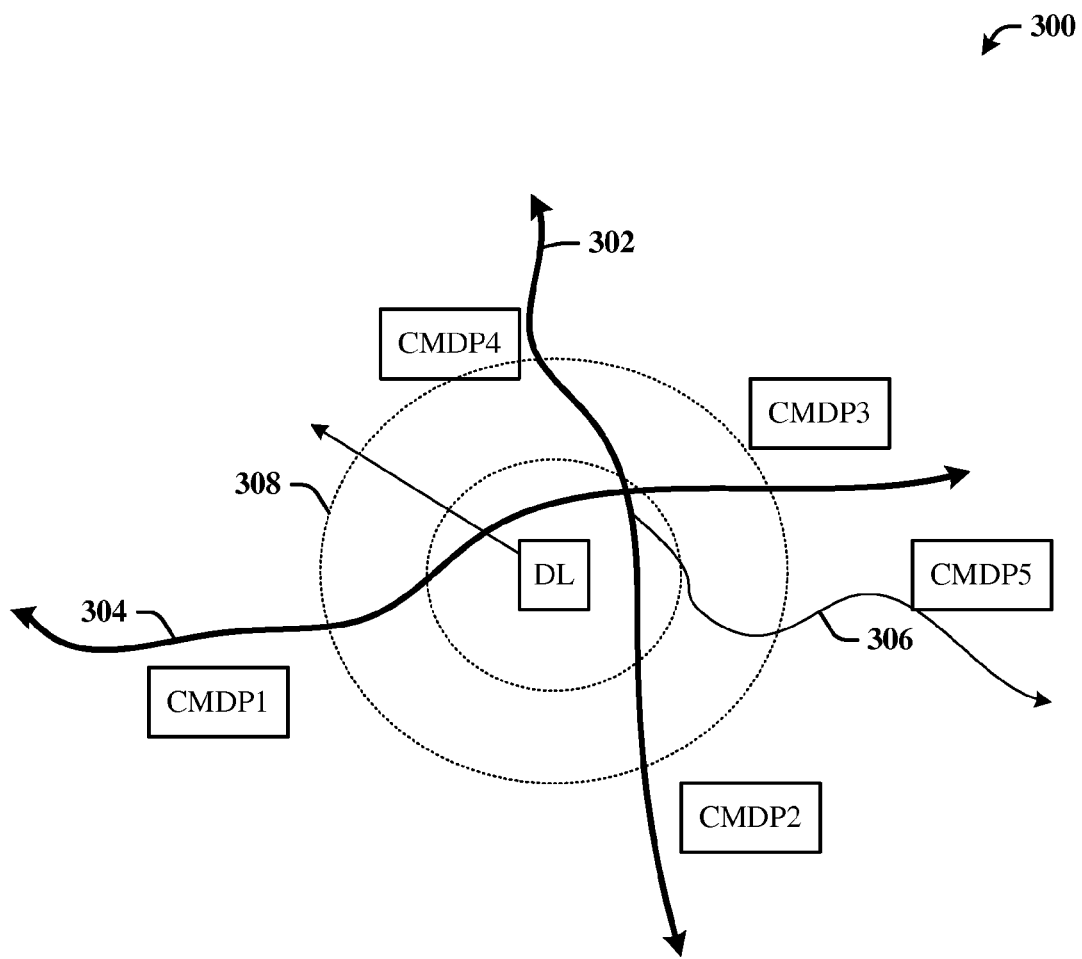
FIG. 3 illustrates an example analysis and selection of candidate meta-departure points and final meta-departure points based on an inward-out technique.

FIG. 3 illustrates an example analysis and selection of candidate (CMDPs) and final MDPs based on an inward-out technique. The example is described in relation to a map 300. A user provides a destination location (DL) based on which the system analyzes the DL in relation to the region surrounding the DL. The system computes that there are two major transportation routes relative to the DL: a first road 302 (e.g., a North-South highway), a second road 304 (e.g., an East-West highway), and a third road 306 (terminating near the DL). The system then analyzes the transportation routes and computes outwardly from the DL (as indicated by circles 308 of increasingly larger radius) to find candidate meta-departure points. Here, five points are found relative to the routes (or roads): a first point (CMDP1) and a third point (CMDP3) relative to the second road 304, a second point (CMDP2) and fourth point (CMDP4) relative to the first road 302, and a fifth point (CMDP5) relative to the third road 306 and the second road 304.

In this particular example, the system selects four of the candidate meta-departure points (CMDP1-4) due to proximity well-known transportation routes, complexity in traveling from the CMDP to the DL, the cost functions, and/or other factors. The fifth point (CMDP5) was ranked lower due to the less than commonly-known route relative to the other routes (302 and 304), and thus, rejected for presentation. However, in an alternative embodiment, the fifth point (CMDP5) could be selected and presented. The number of CMDPs selected as well as the final MDPs can be configurable by the user or set as a default without user capability to change the number.

Additionally, one or more algorithms can be employed for selecting the roads, CMDPs, final MDPs statistically and/or probabilistically that weigh factors to determine the optimal means for the user navigating to the DL.

For a specific implementation of driving directions in North America, the following method can be used for an inside-out approach. Starting from the specified destination, a search is conducted backwards and outwards along the transportation network(s) in which the user is interested. This search continues until a sufficient number (e.g., predetermined) of CMDPs is found or a cost function limit has been exceeded.

A CMDP is recorded if the search encounters a candidate location that is part of a set of interesting points and is ranked sufficiently high to be considered as a CMDP. As defined herein, an interesting point can include a manmade and/or natural landmark or structure (e.g., building, business, mountain, lake, highway, etc.) that is or is likely to be commonly-known in the region associated with the destination location. In many scenarios, the interesting point will be a road or highway considered a main transportation conduit or an important and heavily-traveled arterial road.

The properties of the CMDPs, such as near a major highway or another well-known business, for example, are noted during discovery and the search is conducted forward and backward along the highway to mark the associated CMDPs as "searched". This reduces duplications and can provide an MDP further up the road to give more context to the UI at a later time. This information can be used to determine the suitability of existing CMDPs and whether a sufficient number of departure points have been located. Suitability factors can include, but are not limited to: the distance of the CMDP from the destination location; the cardinal orientation from the destination location and the general direction and approach users would be coming from if using a meta-departure point (this can be determined by tracking backward on the roadway from the departure point and noting the cardinal orientation to the destination); and, the characteristics of roadway associated with the CMDP. Other properties can include analyzing past direction requests by other users to an area close to the selected destination and noting major highways used to get there. This builds a tally of the most frequently used locations and can be used as a factor to determine the best CMDP to use. Similarly, historical and/or realtime traffic conditions can be utilized as a measure that the user is likely to recognize the highway (e.g., the busier the highway, the greater the likelihood the user will know of the highway).

Once the number of CMDPs has been received, the system evaluates all the candidates and generates a set of final MDPs (e.g., configurable from 3-6 MDPs) that will be used for the route calculation. The final set of MDPs represents the approaches that are distributed evenly around possible inbound route to the destination location. The final set of MDPs are located on major highways, if possible; however, major arterial roads and other conduits can be considered if no suitable highway to replace that approach is found. The system ensures that there are no duplicates of MDPs along the same roadway or a very similar approach direction.

When the final set of MDPs has been determined, the system generates presentation information that facilitates the presentation of the sets of instructions for navigating from the MDPs to the destination location. The presentation information can include a description string for directions to the destination that is easy to understand. The string can include the roadway name as well as approach direction. The general approach direction can be determined by examining the road geometry from the potential MDP and/or the highway identifier (e.g., From the South (I-5 North)). Highway shields, icon(s) and/or other graphical indicia that serve as a visual cue of the roadway for which a given MDP is associated. Location identifiers for the MDPs allow a precise route to be calculated from that MDP to the specified destination location. Note that this specific example uses roadways as identifiers for the approach. A variation on this example can use neighborhoods or major landmarks.

Figure 4:
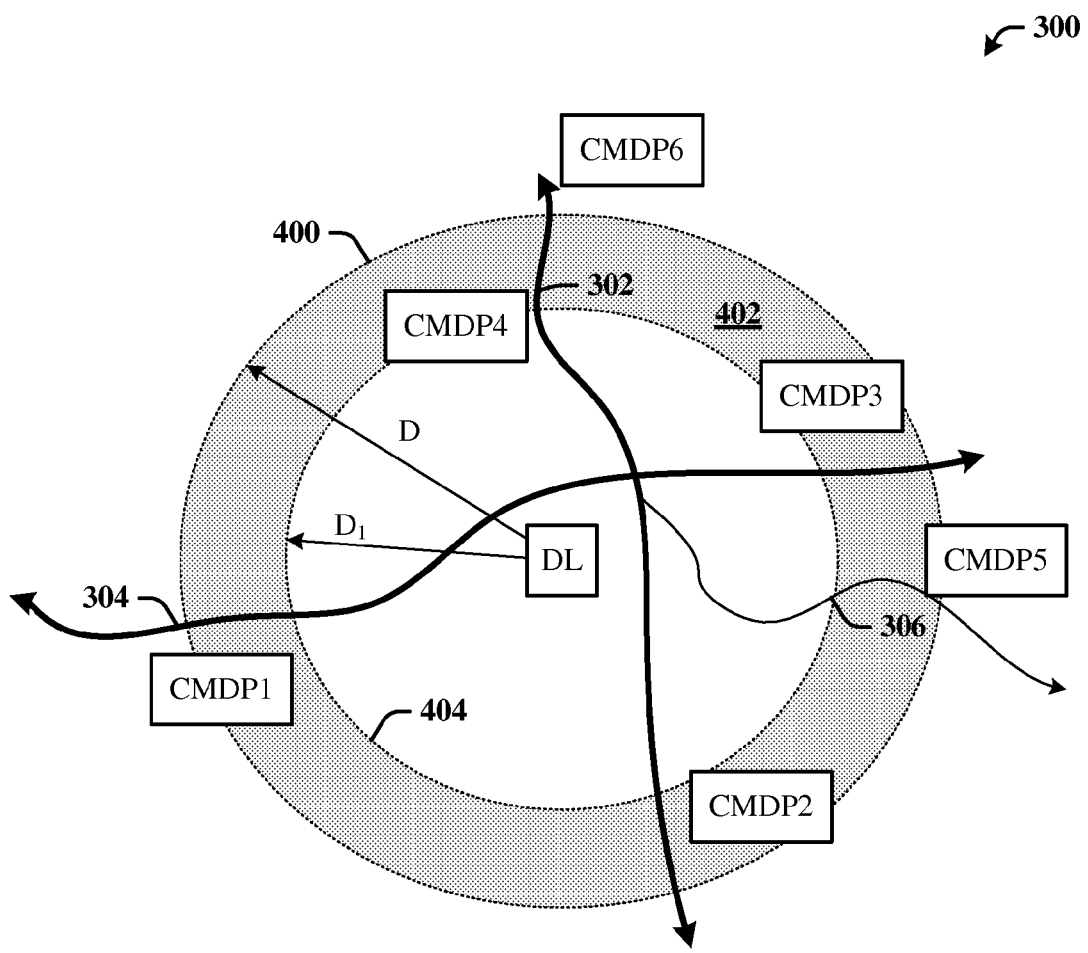
FIG. 4 illustrates an example analysis and selection of candidate meta-departure points and final meta-departure points based on an outward-in technique.

FIG. 4 illustrates an example analysis and selection of CMDPs and final MDPs based on an outward-in technique. The example is described in relation to the map 300 of FIG. 3, the DL, and routes (302, 304, and 306). According to the outward-in technique, the analysis component operates on a predetermined distance (or radius) D from the DL, which distance D defines a circle 400 about the DL. In one embodiment, a large set of CMDPs on or within the circle 400 are selected, and then analyzed against the transportation routes (302, 304, and 306) based on one or more factors that are described herein (e.g., cost function, complexity, distance, etc.). According to this technique, the five CMDPs (CMDP1-5) are selected for further analysis, whereas a sixth point (CMDP6) is not considered because it lies outside the circle 400 defined by the distance D.

In an alternative embodiment, the CMDPs can be selected based on a distance band (or grayed annular region) 402 defined by distance $D_1$ from the DL (a second circle 404) to the distance D from the DL. In other words, only CMDPs relative to this band 402 will be selected for consideration as CMDPs. The final MDPs are determined on factors related to distribution, cardinal directions, transportation routes, complexity, well-known routes, and so on.

One general procedure for the outward-in technique begins with the specified destination location, and generates a number of MDPs that are of a predetermined distance from the destination. These locations can be considered based on distribution (e.g., even) in all cardinal directions.

The sets of incoming directions are then automatically generated and based on these sets the routes (e.g., 3-6) that are distributed evenly among the possible cardinal approaches to the destination are selected. MDP locations are selected along these resultant routes to be the generated departure points that will be used to provide multiple sets of directions without the need for the user to specify an originating location. Representative strings are generated that describe the selected routes and the overall cardinal direction employed is based on the orientation between the destination location and MDP used to compute this particular departure point.

Figure 5:
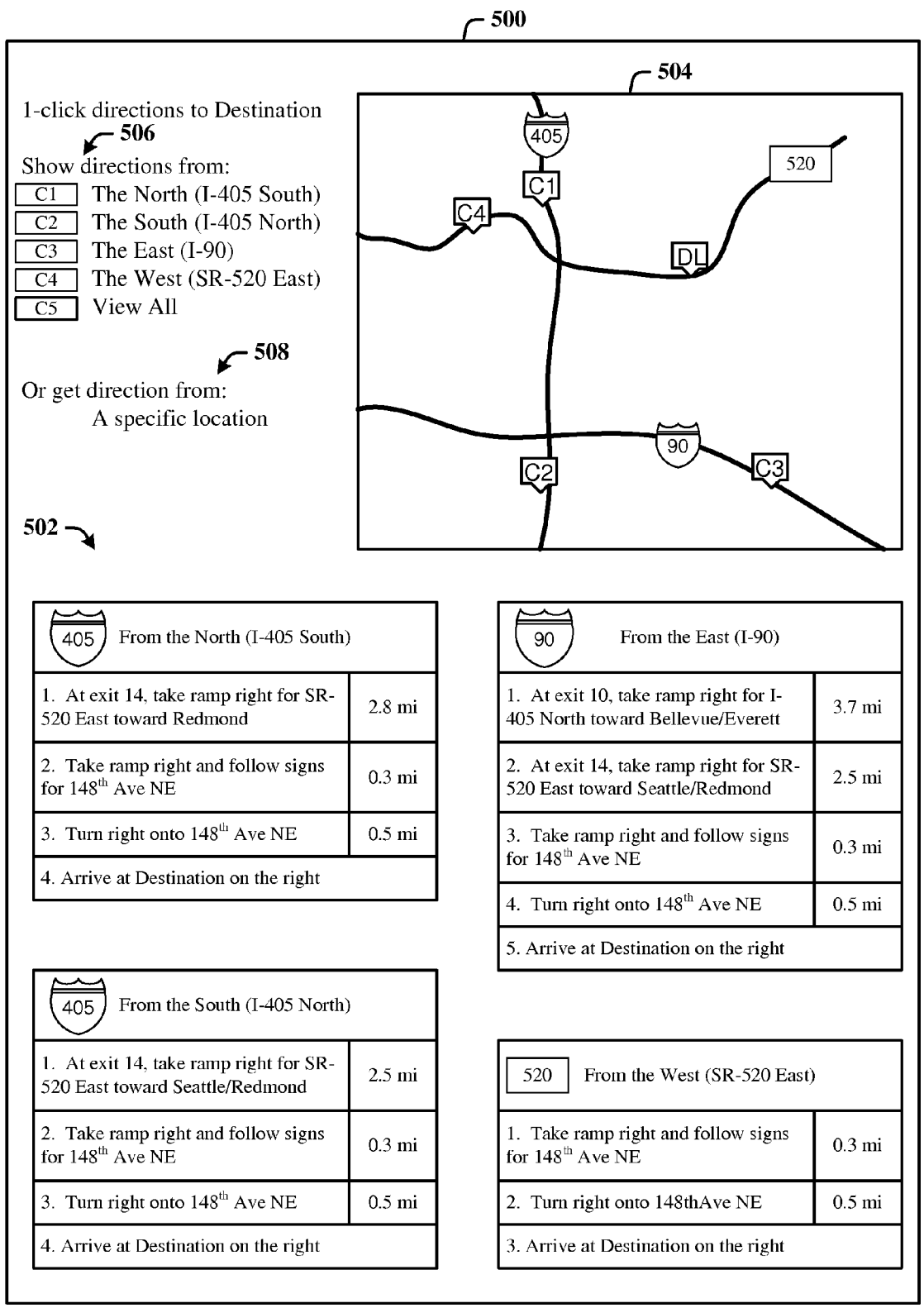
FIG. 5 illustrates an exemplary user interface for presenting multiple sets of directions from final meta-departure points to the destination location and a map marked with departure point identifiers.

FIG. 5 illustrates an exemplary user interface (UI) 500 for presenting multiple sets of directions 502 from final meta-departure points to the destination location and a map 504 marked with departure point identifiers. Here, four MDPs (represented by four different colors C: C1, C2, C3, and C4) are selected for the destination location (DL) along major routes (I-90 and I-405) relative to the destination location DL. The UI 500 presents user-selectable options 506 for selecting separately one or more of the four sets of directions 502 or all the sets of direction 502 (View All). Here, the user has selected all the sets of directions 502 for viewing. The UI 500 allows the user to make one selection (or 1-click) to view all the directions from the different MDPs.

The systems and methods described herein provide quick access to directions to the destination location DL without requiring additional user input about the departure point, or if the user does not know of departure point (e.g., traveling in a city or region while on business, vacation, etc.). The UI 500 presents these multiple direction sets 502 to the user in a way that is easy to understand and flexible. The UI 500 allows the user to see the overall approaches from the MDPs to the DL at a glance, and allows for closer examination of a specific route, if desired.

The exact implementation of the UI 500 can vary depending, but can include the following properties. The UI 500 provides color coordination. Multiple direction sets 502 to the specified destination location are shown, each with indicia (e.g., colors) that correlate the difference pieces of information. For example, all information pertaining to a specific route (e.g., route 405 and MDP C1) is colored in a similar way to provide a quick visual relationship to users for easily linking the map information and instructions together.

Unlike conventional point-to-point maps, the map 504 shows an optimized view of the meta-departure points. The map 504 shows all direction sets at the same time and is positioned such that the following are in view: the specified destination, all computer meta-departure points, and the route from each meta-departure point to the destination location. In addition, the route from each meta-departure point can be color coded.

The UI 500 and display would be created in a way that optimizes printing on a single page (e.g., Letter size, A4 size, etc.). This can involve laying out essential information for navigation in a rectangular pattern. Specific details will not be presented to the user unless specifically requested by the user.

The UI 500, as processed and presented by the presentation component (based on instruction sets received from the routing component), can default the view to provide a quick glance of all reasonable approaches. The UI 500 can be designed to present a selection mechanism (e.g., that includes the user-selectable options 506) that allows the user to view a particular approach in greater detail. When a specific route is selected, the layout of the page can be made to change to display the map 504 in a more focused view of the approach, with more detailed and larger directions. The selection mechanism can also be color coded.

It is possible that none of the generated routes as defined by the instruction sets 502 are suitable for a particular use case. Therefore, in addition to the selection of generate routes there can be an option 508 to enter a specific start and end location in the conventional way.

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
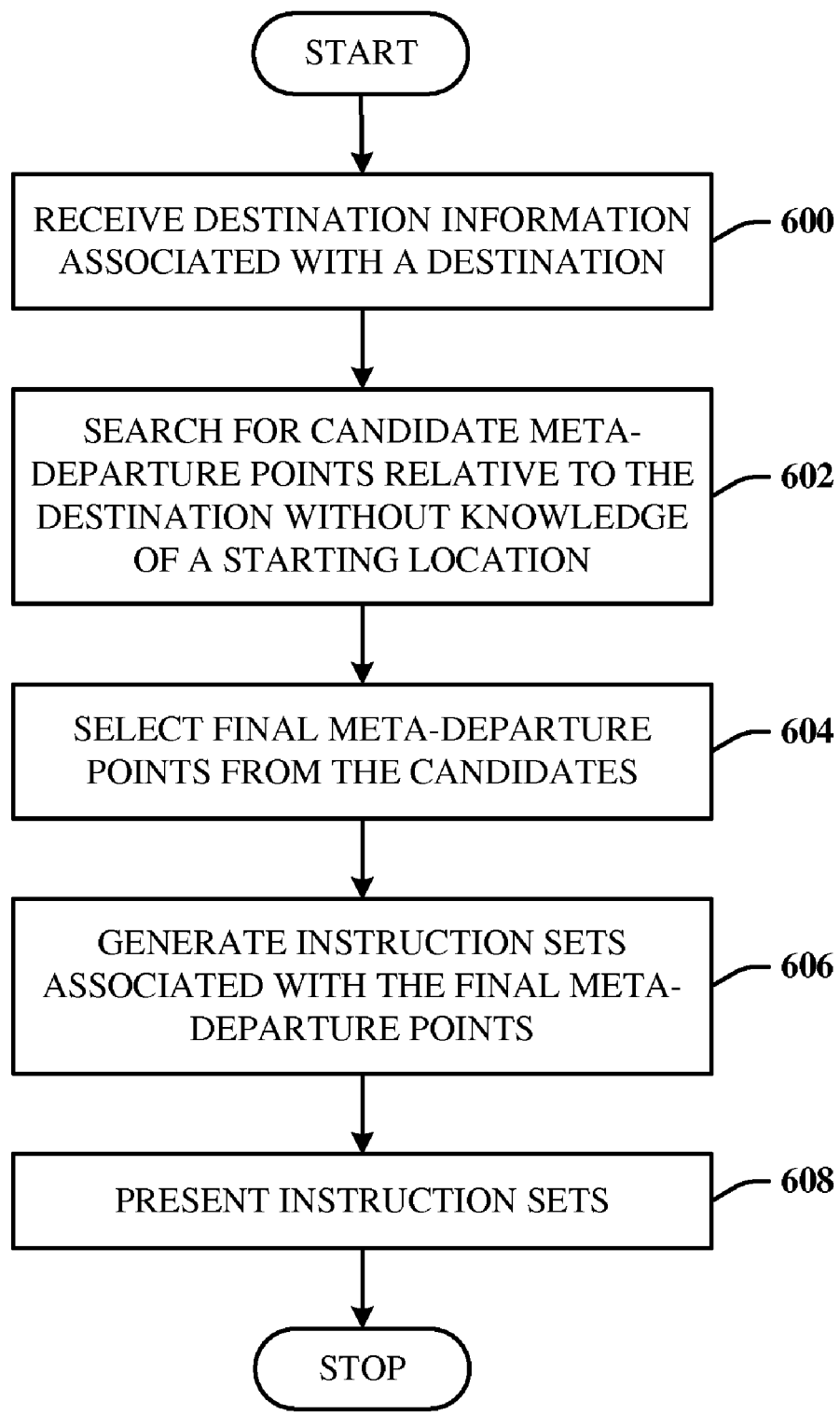
FIG. 6 illustrates a computer-implemented method of providing navigation instructions.

FIG. 6 illustrates a computer-implemented method of providing navigation instructions. At 600, destination information associated with a destination is received. This can be provided manually by a user choosing to travel to the destination or from another system (e.g., computing system) that inputs the destination information. At 602, candidate meta-departure points relative to the destination are searched. At 604, final meta-departure locations are selected from the candidate meta-departure points. At 606, instruction sets associated with the final meta-departure points are generated. At 608, the instruction sets are presented (e.g., via a user interface, audio system, other media presentation means, etc.). The instruction sets include directions for navigating geographically from the final meta-departure points to the destination.

Figure 7:
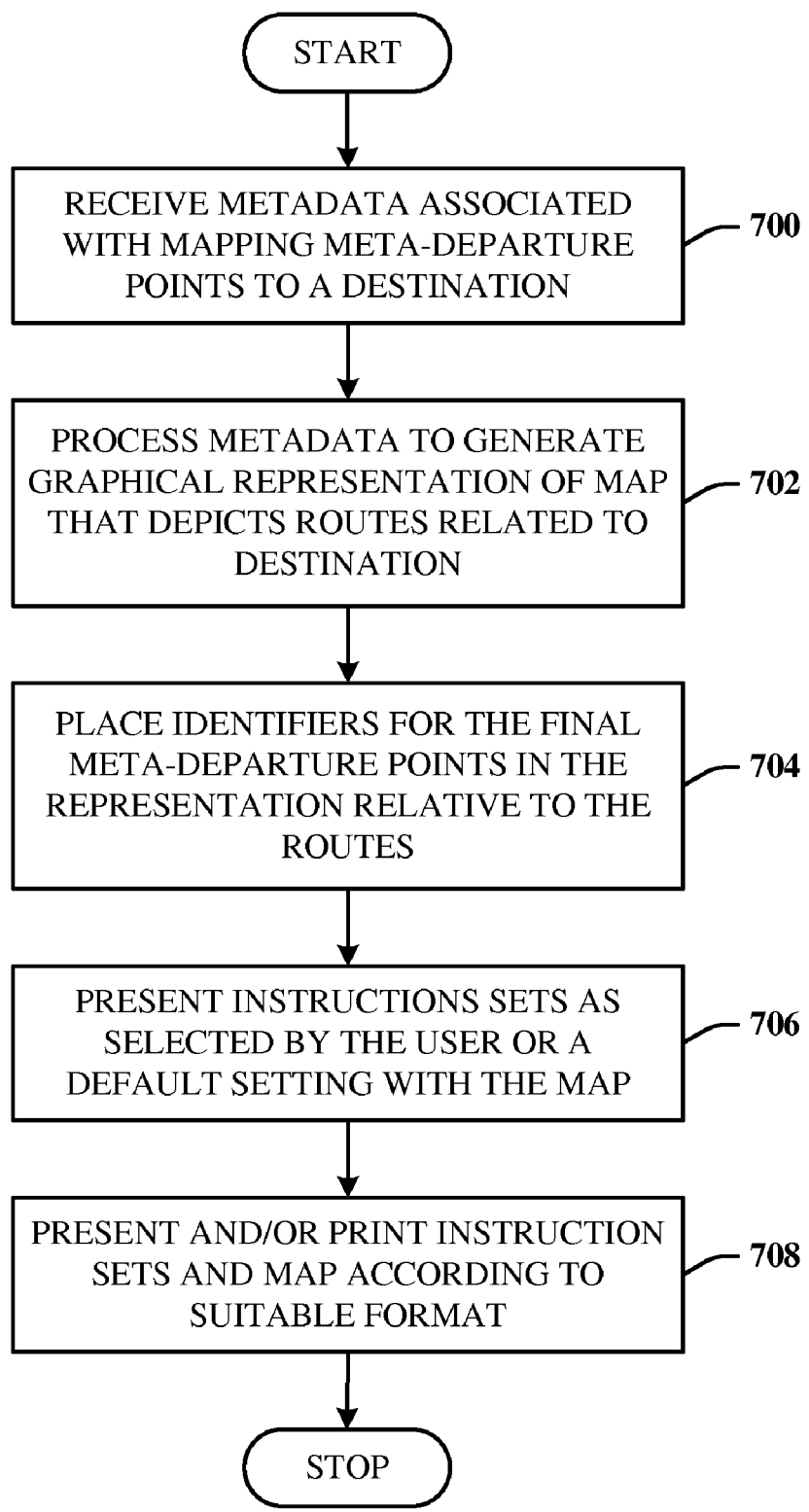
FIG. 7 illustrates a method of presenting the instructions generated for navigating from the final meta-departure points to the destination location.

FIG. 7 illustrates a method of presenting the instructions generated for navigating from the final meta-departure points to the destination location. At 700, metadata such as cardinal direction information, final meta-departure points information, region information, transportation routes information, distance information, etc., is received. This metadata information can serve as the basis for generating the instruction sets. At 702, the metadata is processed to generate a graphical representation of a map that depicts transportation routes related to the destination. At 704, identifiers for the final meta-departure points and destination are placed in the representation relative to the transportation routes. At 706, the instruction sets are presented as selected (e.g., separately, as subsets, all, etc.) by the user or a default configuration along with the map. At 708, the map and instruction sets are presented and/or printed according to a suitable format. The format can be based on the device display, default settings, user preferences (e.g., text only), printer settings, etc.

Figure 8:
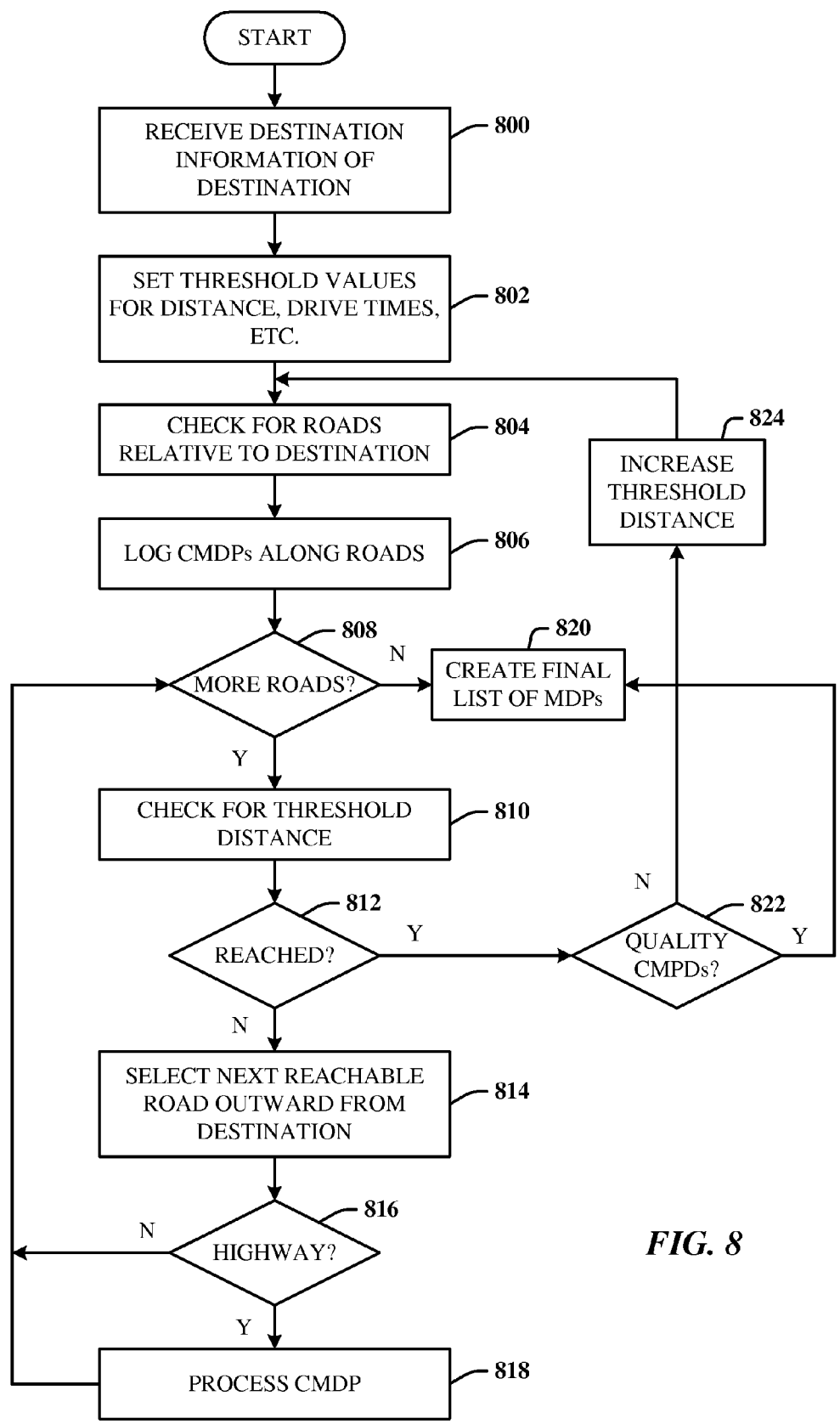
FIG. 8 illustrates a method of determining meta-departure points.

FIG. 8 illustrates a method of determining meta-departure points. At 800, destination related to a destination is received. At 802, threshold values related to distance from CMDP, drive times, and other criteria are set. At 804, a check is made for roads relative to the destination. At 806, the system logs CMDPs along the roads. At 808, if more roads are desired due to the number of CMDPs being low, flow is to 810, to check the threshold distance setting to determine if the threshold distance has been reached. In one embodiment, the initial threshold is set to ten minutes of drive time; however, this setting can be made dynamic.

At 812, if the threshold has not been reached, flow continues to 814 to select the next reachable road outward from the destination. Selection can be according to or similar to Dijkstra's algorithm (a greedy algorithm that finds a shortest path), or other common path-finding algorithms. At 816, the system checks if the road is a highway, and if so, flow is to 818 to process the associated CMDP. The definitions or criteria used in the determination process of whether a road is a highway can be complex. This can include road metadata and names, and other attributes (e.g., amount of traffic, lanes, width, interstate versus local, etc.) that make the road appear important. Flow is then back to 808 to check if more roads are desired. However, if the road is not a highway, flow is back to 808 to check if more roads are desired to meet the number of CMDPs requested.

At 808, if no more roads are needed, flow is to 820 to create the final list of MDPs for presentation. At 812, if the distance threshold was reached, yet the desired number of roads has not been reached, flow is to 822 to process the existing set of CMDPs to determine if a sufficient number quality CMDPs has not been obtained, flow is to 824 to increase the distance threshold and then continue at 804 to check for more roads. Alternatively, if the desired number of quality CMDPs has been obtained, flow is from 822 to 820 to create the list of final MDPs.

Figure 9:
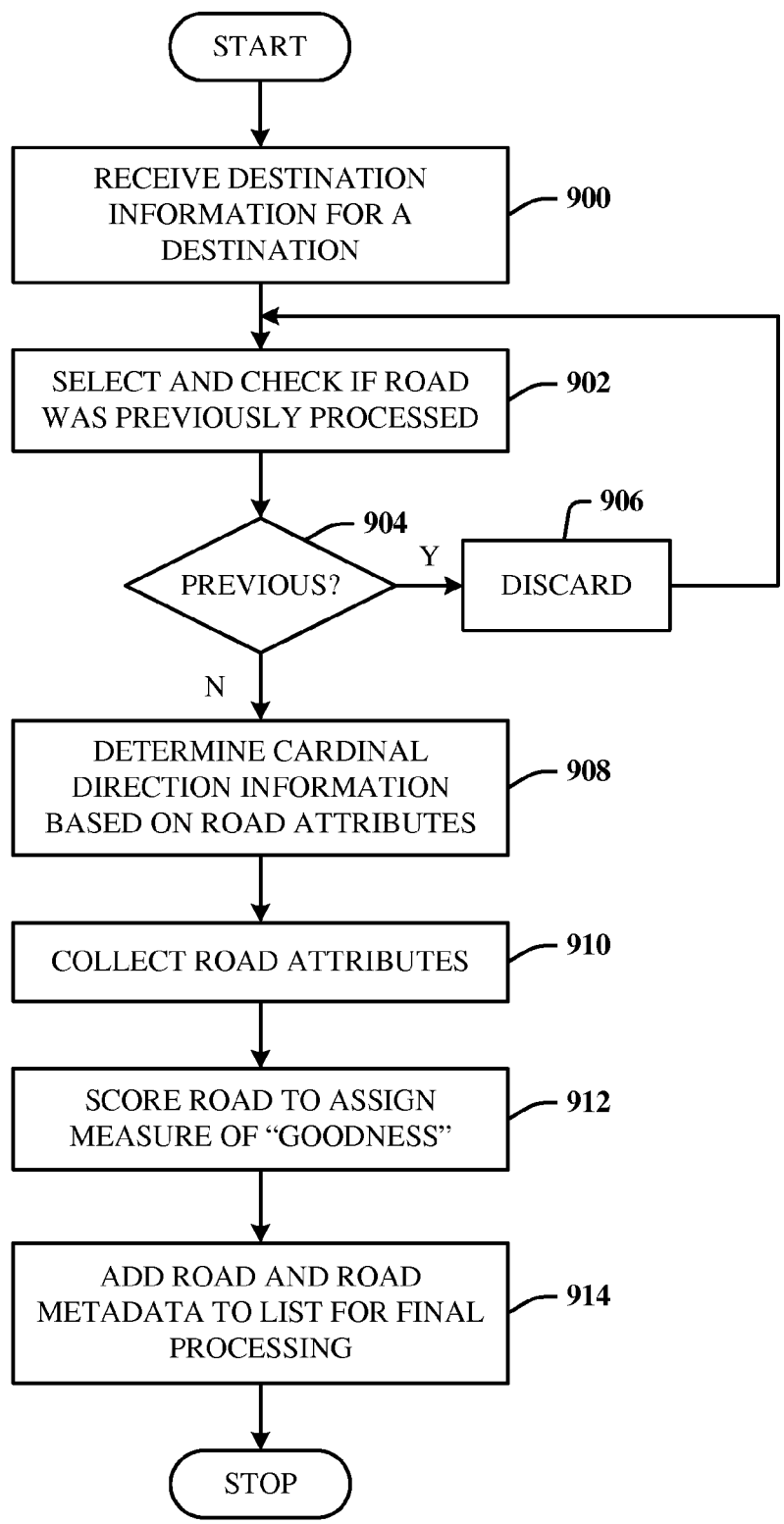
FIG. 9 illustrates a method of processing a single meta-departure point.

FIG. 9 illustrates a method of processing a single meta-departure point. At 900, after the destination information is received, an analysis algorithm works outward from the destination location following a road as far as possible up to threshold criteria. This criterion can be based on driving time on the road from the destination, distance from the destination, and other criteria. This process reduces or removes duplicates, in case the road is found more than once. Additionally, the algorithm discovers which direction the road is truly coming from. Moreover, this road analysis attempts to eliminate short roads. At 902, a check is made to determine if the road has been previously processed. If so, flow is from 904 to 906 to discard this road. Flow is then back to 902 to select and process a new road.

If the road was not previously processed, flow is from 904 to 908, to determine cardinal direction information (e.g., N, S, E, W, NE, etc.) based on road attributes (e.g., signage, road trace). At 910, road attributes (e.g., road class, name, coordinates, etc.) are collected. At 912, a score is computed for the road (e.g., based on class, distance, etc.) as a measure of overall "goodness" as a meta-departure point. At 914, the road and road metadata is added to a list for final processing.

Figure 10:
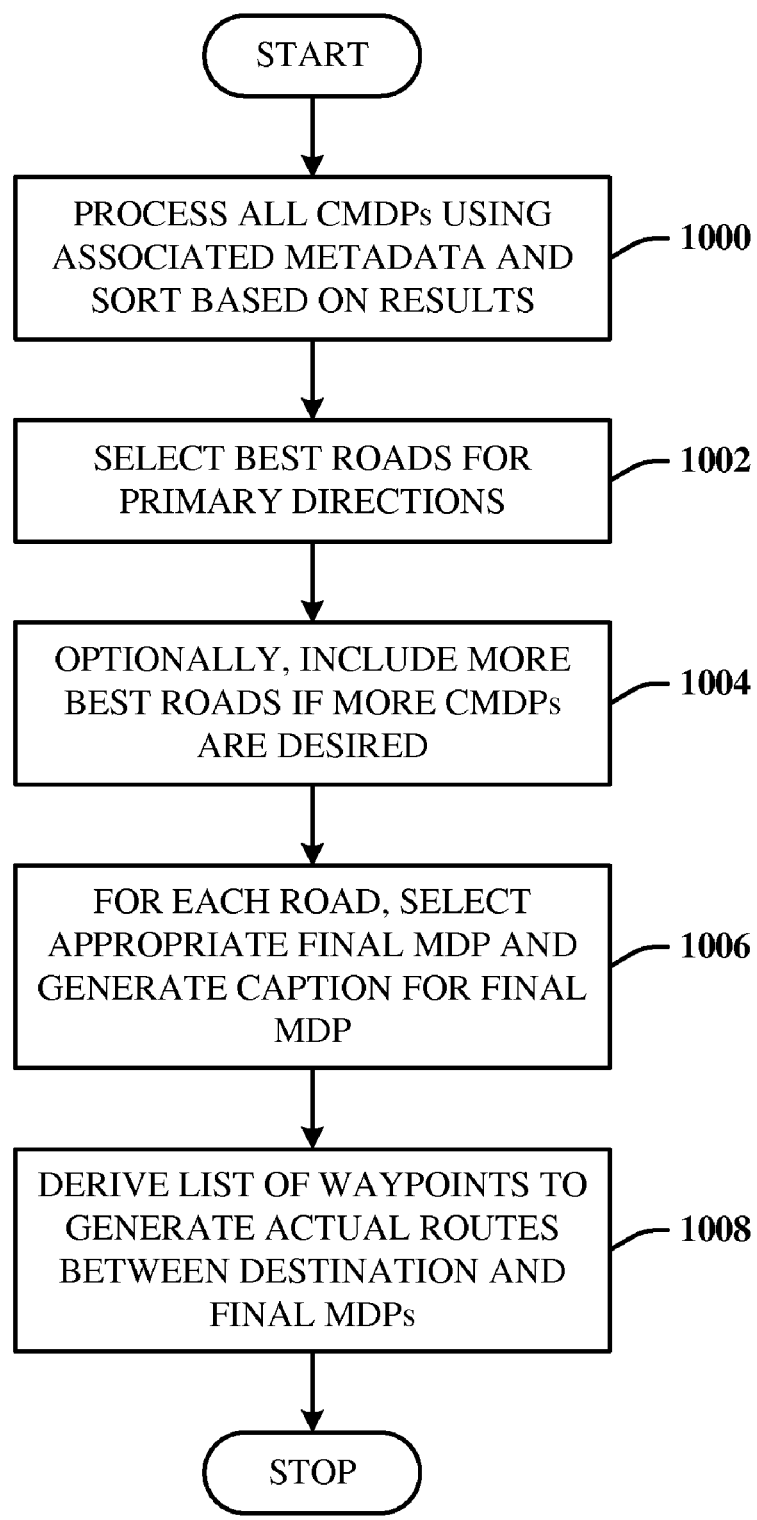
FIG. 10 illustrates a method of ranking and sorting candidate meta-departure points for final processing.

FIG. 10 illustrates a method of ranking and sorting CMDPs for final processing. At 1000, all CMDPs are processed using metadata (e.g., cardinal information, overall quality, etc.) and sort based on the results. At 1002, the "best" roads for the primary directions (e.g., N, S, E, and W) are selected. At 1004, if more CMDPs are desired, the remaining best roads can be included in the processing. At 1006, for each road, an appropriate exact final MDP is selected, and a caption is generated for this final MDP. At 1008, a list of waypoints is derived, which the client can use to generate actual routes between the destination and the final MDPs.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 11:
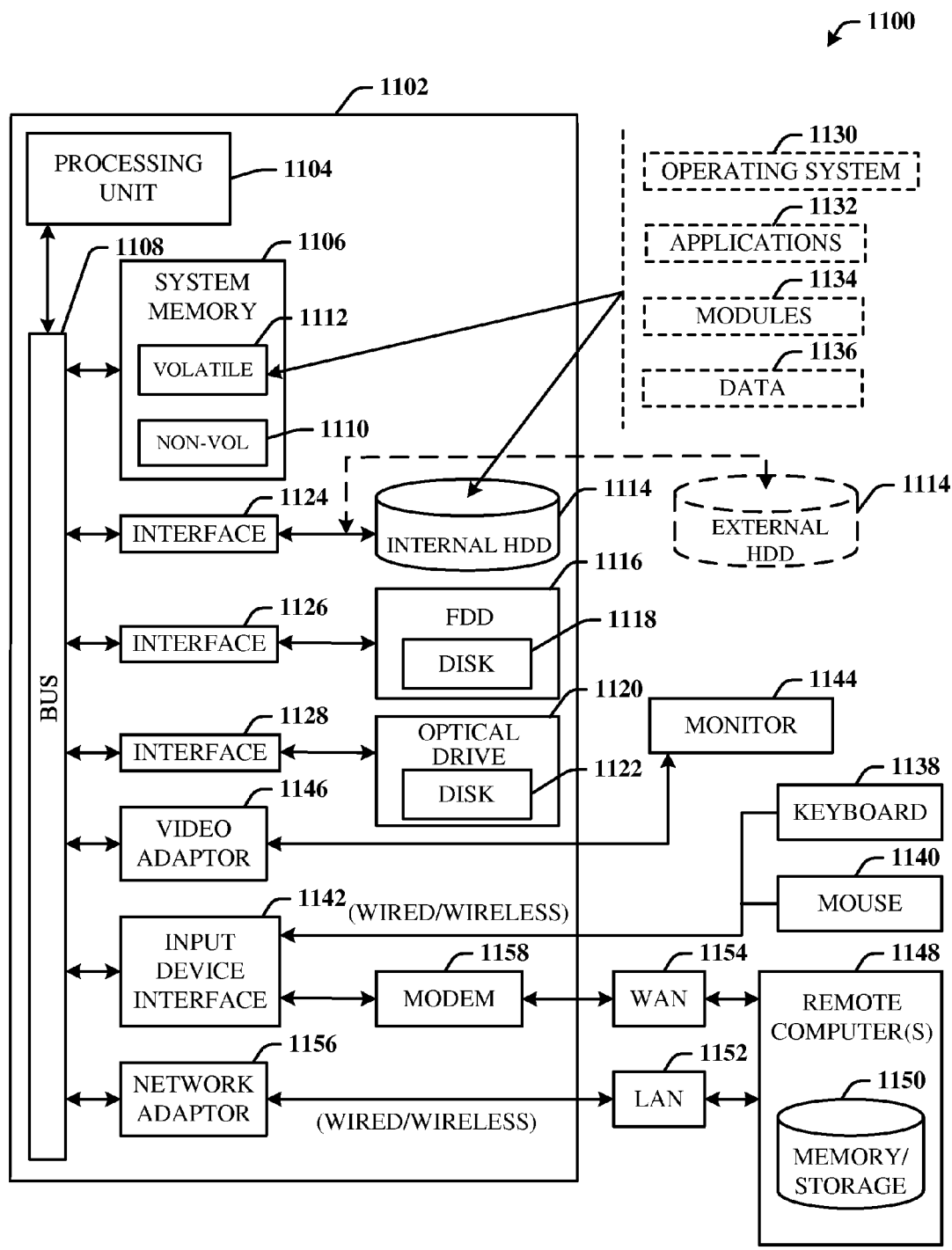
FIG. 11 illustrates a block diagram of a computing system operable to execute the mapping algorithms of the disclosed architecture.

Referring now to FIG. 11, there is illustrated a block diagram of a computing system 1100 operable to execute the mapping algorithms of the disclosed architecture. In order to provide additional context for various aspects thereof, FIG. 11 and the following discussion are intended to provide a brief, general description of a suitable computing system 1100 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 11, the exemplary computing system 1100 for implementing various aspects includes a computer 1102 having a processing unit 1104, a system memory 1106 and a system bus 1108. The system bus 1108 provides an interface for system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 can include non-volatile memory (NON-VOL) 1110 and/or volatile memory 1112 (e.g., random access memory (RAM)). A basic input/output system (BIOS) can be stored in the non-volatile memory 1110 (e.g., ROM, EPROM, EEPROM, etc.), which BIOS stores the basic routines that help to transfer information between elements within the computer 1102, such as during start-up. The volatile memory 1112 can also include a high-speed RAM such as static RAM for caching data.

The computer 1102 further includes an internal hard disk drive (HDD) 1114 (e.g., EIDE, SATA), which internal HDD 1114 may also be configured for external use in a suitable chassis, a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as a DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 1112, including an operating system 1130, one or more application programs 1132, other program modules 1134, and program data 1136. The one or more application programs 1132, other program modules 1134, and program data 1136 can include the input component 102, analysis component 104, routing component 106, presentation component 202, instruction sets 204, map 206, UI 500, and selectable options 506, for example.

All or portions of the operating system, applications, modules, and/or data can also be cached in the volatile memory 1112. It is to be appreciated that the disclosed architecture can be implemented with various commercially available operating systems or combinations of operating systems.

A user can enter commands and information into the computer 1102 through one or more wire/wireless input devices, for example, a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces such as a parallel port, IEEE 1394 serial port, a game port, a USB port, an IR interface, etc.

A monitor 1144 or other type of display device is also connected to the system bus 1108 via an interface, such as a video adaptor 1146. In addition to the monitor 1144, a computer typically includes other peripheral output devices (not shown), such as speakers, printers, etc.

The computer 1102 may operate in a networked environment using logical connections via wire and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, is connected to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi (or Wireless Fidelity) and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3 or Ethernet).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented navigation system, comprising:
    an input component for receiving a destination location to which a user wants to travel, without specifying a starting location;
    an analysis component for selecting multiple meta-departure points associated with multiple different routes to the destination location from multiple different logical directions from candidate meta-departure points based on at least one of a geographical distribution or cardinal orientation around or relative to the destination location, such that a minimum of meta-departure points cover a maximum percentage of potential inbound travel routes, independent of knowledge of a specific starting location; and
    a routing component for automatically generating multiple sets of instructions corresponding to the different logical directions associated with the multiple meta-departure points for geographically navigating the different routes to the destination location from the multiple meta-departure points.

2. The system of claim 1, wherein the analysis component selects the meta-departure points based on local locations that are likely to be familiar to local users.

3. The system of claim 1, wherein the analysis component selects the meta-departure points based on proximity of the meta-departure points to major transportation routes and to the destination location.

4. The system of claim 1, wherein the analysis component selects the meta-departure points based on a cost function that considers distance and route complexity from the meta-departure points to the destination location.

5. The system of claim 1, wherein the analysis component selects the meta-departure points based on geographical distribution of the meta-departure points relative to the destination location.

6. The system of claim 1, wherein the analysis component selects a minimum number of the meta-departure points that cover a greatest percentage of inbound routes to the destination location.

7. The system of claim 1, wherein the analysis component generates the candidate meta-departure points by searching outward from the destination location relative to major transportation routes until a predetermined number of the candidate meta-departure points is obtained.

8. The system of claim 1, wherein the analysis component generates the candidate meta-departure points from which the meta-departure points are chosen by selecting locations within a predetermined distance from the destination location and searching inward from the locations for the candidate meta-departure points relative to commonly-known transportation routes to the destination location.

9. The system of claim 8, wherein the candidate meta-departure points are distributed about the destination location and according to cardinal directions.

10. The system of claim 1, further comprising a presentation component for presenting separate lists of instructions for guiding the user from the corresponding meta-departure points to the destination location and a map that illustrates the meta-departure points relative to transportation routes and the destination location.

11. A computer-implemented method of providing navigation instructions employing a computer programmed to perform the method, comprising:
receiving destination information associated with a destination, without specifying a starting location;
searching for candidate meta-departure points associated with multiple different routes to the destination from multiple different logical directions, independent of knowledge of a starting location;
selecting final meta-departure locations from the candidate meta-departure points based on at least one of a geographical distribution or cardinal orientation around or relative to the destination location, such that the final meta-departure points cover a largest percentage of potential inbound travel routes;
generating multiple instruction sets corresponding to the multiple different logical directions associated with the final meta-departure points; and
presenting the instruction sets, the instruction sets include directions for navigating geographically the multiple different routes from the final meta-departure points to the destination.

12. The method of claim 11, further comprising presenting a graphical representation of a map that depicts transportation routes related to the destination and identifiers for the final meta-departure points relative to the transportation routes.

13. The method of claim 11, further comprising processing a cost function as part of selecting the candidate meta-departure points.

14. The method of claim 11, further comprising sorting and ranking the candidate meta-departure points to determine the final meta-departure points.

15. The method of claim 11, further comprising setting threshold criteria related to road selection based on distance and driving time.

16. The method of claim 11, further comprising analyzing a road and road metadata as a possible transportation route between the destination and a final meta-departure point.

17. The method of claim 11, further comprising searching for candidate meta-departure points based on an increasing distance from the destination.

18. The method of claim 11, further comprising minimizing a number of candidate meta-departure points along a selected route based on transportation routes of a region and a likelihood that a majority of users in that region would use the transportation routes.

19. The method of claim 11, further comprising identifying candidate meta-departure points proximate a fixed distance from the destination and analyzing roads from the candidate meta-departure points inward to the destination as routes for which the instruction sets are generated and presented.

20. A computer-implemented system, comprising:
computer-implemented means for receiving destination information associated with a destination, without specifying a starting location;
computer-implemented means for searching for candidate meta-departure points associated with multiple different routes to the destination from multiple different logical directions;
computer-implemented means for selecting final meta-departure locations from the candidate meta-departure points based on at least one of a geographical distribution or cardinal orientation around or relative to the destination location, such that the final meta-departure points cover a largest percentage of potential inbound travel routes;
computer-implemented means for generating multiple instruction sets corresponding to the multiple different logical directions associated with the final meta-departure points; and
computer-implemented means for presenting the instruction sets, the instruction sets include directions for navigating geographically the multiple different routes from the final meta-departure points to the destination.

* * * * *